US005726244A

United States Patent [19]
McGee et al.

[11] Patent Number: 5,726,244
[45] Date of Patent: Mar. 10, 1998

[54] AQUEOUS COATING COMPOSITIONS FOR ENVIRONMENTAL ETCH RESISTANT COATINGS

[75] Inventors: John D. McGee, Highland; Donald H. Campbell, Wixom; John W. Rehfuss, West Bloomfield, all of Mich.

[73] Assignee: BASF Corporation, Southfield, Mich.

[21] Appl. No.: 513,587

[22] Filed: Aug. 10, 1995

[51] Int. Cl.$^6$ ...................................................... C08L 33/08
[52] U.S. Cl. ................................. 525/78; 525/80; 525/81; 525/124; 525/142; 525/143; 525/162; 525/163; 525/190; 525/308; 525/278; 525/902
[58] Field of Search .............................. 525/286, 293, 525/303, 912, 131, 127, 300, 66, 64, 68, 124, 142, 143, 162, 163, 101, 190, 78, 80, 81, 301, 308, 278, 902; 526/273, 320; 524/531, 558, 523

[56] References Cited

U.S. PATENT DOCUMENTS 5,356,669 10/1994 Rehfuss et al. ................ 427/407.1
5,384,367 1/1995 Swarup ............................ 525/169
5,397,646 3/1995 Nickle et al. .................... 428/423.1
5,567,761 10/1996 Song ................................. 524/523

FOREIGN PATENT DOCUMENTS 1118128 10/1978 Canada.
WO 94/10212 5/1994 European Pat. Off..

Primary Examiner—Paul J. Thibodeau
Assistant Examiner—D. Lawrence Tarazano
Attorney, Agent, or Firm—Paul L. Marshall

[57] ABSTRACT

Environmental etch resistant coatings are described. The coatings are derived from aqueous, curable coating compositions comprising:

(a) a carbamate-functional grafted acrylic polymer that comprises the reaction product of a first acrylic polymer and a second acrylic polymer, with at least one of the first and second acrylic polymers having groups that impart water dispersibility to the grafted acrylic polymer, and at least one of the first and second acrylic polymers having carbamate functionality; and (b) a second component comprising a compound having a plurality of functional groups that are reactive with the carbamate functionality.

21 Claims, No Drawings

AQUEOUS COATING COMPOSITIONS FOR ENVIRONMENTAL ETCH RESISTANT COATINGS

FIELD OF THE INVENTION

This invention relates to aqueous, curable coating compositions and coatings produced therefrom. In particular, the invention relates to topcoat coatings, especially those with high gloss and/or high DOI (distinctness-of-image) such as those used as automotive topcoats.

BACKGROUND OF THE INVENTION

The effect of the coating process on the environment and the effect of the environment on coatings have increasingly shaped the coatings art in the last few decades. The industry has put considerable effort into developing coatings with materials that will be less harmful toward the environment, such as coatings containing lower levels of volatile organic compounds for a lower impact on the environment during their application. As another concern, it has been difficult to devise such a coating that will also have the desired resistance to environmental degradation.

One mode of environmental degradation that has attracted attention in recent years is environmental etch. "Environmental etch" is the name given to a kind of surface pitting and spotting that is thought to be due to the attack of environmental acids on the coating. Environmental etch manifests itself as spots or marks on or in the coating that often cannot be rubbed out. Environmental etch is particularly a problem where the coating is a high gloss and/or a high DOI (distinctness-of-image) coating, since defects in the surface of such a glossy or highly reflective coating are very noticeable. High gloss and/or high DOI coatings are widely utilized in the coatings art. The automotive industry has made extensive use of such coatings, often as color-plus-clear composite coatings for automotive body panels. Automotive coatings are especially likely to exhibit environmental etch because the significant outdoor exposure and the frequent heat buildup in the coated article are factors favoring etch degradation.

Prior art coating compositions such as high-solids enamels, although known for their durability and weatherability when used in exterior paints, have not provided the desired level of resistance to environmental etch when used as topcoat coatings. Environmental etch has been a particular concern with prior art high gloss or high DOI coatings. Compositions such as polyurethanes, acid-epoxy systems and the like have been proposed for use as topcoat coatings. However, many prior art systems suffer from disadvantages such as coatability problems, compatibility problems with underlying coatings, or high content of volatile organic compounds. Moreover, very few one-pack coating compositions have been found that provide satisfactory resistance to environmental etch, especially under the demanding conditions to which automotive coatings are subjected. Thus, there exists a continuing need for curable coating compositions with low content of volatile organic compounds that provide satisfactory resistance to environmental etch.

SUMMARY OF THE INVENTION

It has now been discovered that an environmental etch resistant coating can be derived from an aqueous, curable coating composition comprising:

(a) a carbamate-functional grafted acrylic polymer that comprises the reaction product of:

(i) a first acrylic polymer, having a functionality (I), and
(ii) a second acrylic polymer, having a functionality (II) that is reactive toward the functionality (I) of the first acrylic polymer, where one or both of the first and second acrylic polymers has groups that impart water dispersibility to the grafted acrylic polymer and one or both of the first and second acrylic polymers has carbamate functionality; and (b) a compound having a plurality of functional groups that are reactive with the carbamate functionality.

The coating, when cured, provides a tough, durable, and attractive finish that is highly resistant to environmental etch. The coating composition can be effectively applied as a one-pack system without the necessity of mixing reactive materials just prior to application as in a two-pack system. The coatings of the invention provide improved resistance to acid etch over previous waterborne systems. The coating is particularly useful as a coating having a 20° gloss, as defined by ASTM D523-89, of at least 80 or a DOI, as defined by ASTM E430-91, of at least 80, or both, and is especially useful as a clear coat in a composite color-plus-clear coating.

DESCRIPTION OF THE PREFERRED EMBODIMENTS

The aqueous, curable coating compositions of the invention contain both a carbamate-functional grafted acrylic polymer and a compound having a plurality of functional groups that are reactive with the carbamate functionality of the acrylic polymer. The grafted acrylic polymer is made by reacting together a first acrylic polymer having a functionality (I) and a second acrylic polymer having a functionality (II) that is reactive toward the functionality (I) of the first acrylic polymer. One or both of the first and second acrylic polymers has carbamate functionality, and one or both of the first and second acrylic polymers has groups that impart water dispersibility to the grafted acrylic polymer.

The carbamate functionality may be on only one of the first and second acrylic polymers. In a preferred embodiment the carbamate functionality is on both the first acrylic polymer and the second acrylic polymer. The carbamate functionality can be introduced onto the acrylic polymer or polymers in a variety of ways. One way to prepare such polymers is to use in the polymerization reaction an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. For example, one method of synthesis involves reaction of a hydroxy ester with urea to form the carbamyloxy carboxylate (i.e., carbamate-modified acrylate). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the carbamate-functional monomer. Other methods of preparing carbamate-modified acrylic monomers are described in the art and can be utilized as well. The acrylic monomer can then be polymerized along with other ethylenically-unsaturated monomers using techniques well-known in the art.

An alternative route for introducing the carbamate functionality onto the acrylic polymer or polymers is to react an already-formed acrylic polymer with another component to adduct a carbamate-functional group to the acrylic polymer backbone, as described in U.S. Pat. No. 4,758,632, the disclosure of which is incorporated herein by reference. One technique for preparing carbamate-functional polymers involves thermally decomposing urea to ammonia and HNCO in the presence of a hydroxy-functional acrylic polymer to form as the reaction product a carbamate-functional acrylic polymer. Another technique involves reacting the hydroxyl group of a hydroxyalkyl carbamate with the isocyanate group of an isocyanate-functional acrylic polymer to form the carbamate-functional acrylic polymer. Isocyanate-functional acrylics are known in the art and are described, for example in U.S. Pat. No. 4,301,257, the disclosure of which is incorporated herein by reference. Ethylenically unsaturated isocyanate monomers are well-known in the art and include meta-isopropenyl-α,α-dimethylbenzyl isocyanate (sold by American Cyanamid as TMI®) and isocyanatoethyl methacrylate. Yet another technique is to react cyclic carbonate groups on an acrylic with ammonia to form the carbamate-functional acrylic polymer. Cyclic carbonate-functional acrylic polymers are known in the art and are described, for example, in U.S. Pat. No. 2,979,514, the disclosure of which is incorporated herein by reference. Another approach is a transcarbamylation reaction of a hydroxy-functional polymer with an alkyl carbamate. A more difficult, but feasible, way of preparing the polymer would be to trans-esterify an acrylate polymer with a hydroxyalkyl carbamate.

In one preferred embodiment, the carbamate functionality comprises the structure —L—O—C(=O)—NHR. R represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided.

L represents a divalent linking group, preferably an aliphatic linking group of 1 to 8 carbon atoms, a cycloaliphatic linking group, or an aromatic linking group of 6 to 10 carbon atoms. Examples of L include

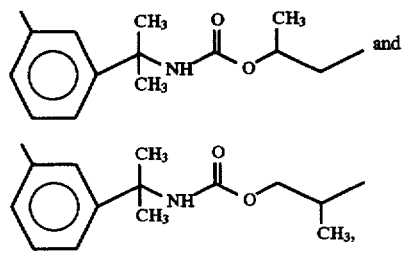

—(CH$_2$)—, —(CH$_2$)$_2$—, —(CH$_2$)$_4$—, and the like. In one preferred embodiment, —L— is represented by —COO—L'—, where L' is a divalent linking group.

L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

Additionally, one or both of the first and second acrylic polymers has thereon hydrophilic groups that impart water dispersibility to the grafted acrylic polymer. While in some cases it may be advantageous to have the groups that impart water dispersibility to the grafted acrylic polymer on both the first and the second acrylic polymers, in other cases it will be preferred to have such groups on only the second acrylic polymer. The dispersions formed from having all of the hydrophilic groups on one polymer may have improved application characteristics. The groups that impart water dispersibility to the grafted acrylic polymer can be anionic, cationic, or nonionic. Anionic and nonionic groups are preferred for many applications because of the tendency of the cationic (e.g., amine) groups on the polymer to cause yellowing in the cured coating. Carboxylic acid groups are particularly preferred as the groups that impart water dispersibility to the grafted acrylic polymer.

Similarly to the introduction of the carbamate groups onto the acrylic polymer or polymers, the groups that impart water dispersibility can be introduced either by polymerization with an ethylenically unsaturated monomer containing such a group or by further reaction of the formed acrylic polymer to adduct the hydrophilic group onto the backbone. Reactive monomers that can be employed during polymerization of the polymer to introduce the groups that impart water dispersibility include ethylenically unsaturated acids and acid anhydrides, ethylenically unsaturated amines, and ethylenically unsaturated polyethers. Useful ethylenically unsaturated acids include α,β-olefinically unsaturated monocarboxylic acids containing 3 to 5 carbon atoms, α,β-olefinically unsaturated dicarboxylic acids containing 4 to 6 carbon atoms and their anhydrides and monoesters, and unsaturated sulfonic acids. Representative examples include acrylic, methacrylic, and crotonic acid; fumaric, maleic, and itaconic acids and anhydrides and their monoesters such as maleic aid monomethyl ester and maleic acid monohexyl ester; and acrylamido methylpropanesulfonic acid. Useful ethylenically unsaturated amines include t-butylaminoethyl methacrylate and dimethylaminoethyl methacrylate. Useful ethylenically unsaturated polyethers include the alkoxy poly (oxyalkylene) alcohol esters or amides of α,β-olefinically unsaturated monocarboxylic acids containing 3 to 5 carbon atoms.

Another technique involves reacting the groups that impart water dispersibility onto the acrylic polymer after the polymerization reaction. This may be accomplished, for example, by synthesizing an hydroxyl-functional acrylic and adducting the hydroxyl groups with an acid anhydride. Another method of preparation would be by synthesizing an isocyanate-functional acrylic and adducting the isocyanate groups with alkoxy poly(oxyalkylene) alcohol or alkoxypoly(oxyalkylene) amine.

The alkoxy poly(oxyalkylene) alcohol or alkoxy poly (oxyalkylene) amine employed in either forming the monomer described above or in reacting onto the acrylic polymer after the polymerization reaction can be obtained by the alkoxylation of monohydric alcohols with ethylene oxide or mixtures of ethylene oxide with other epoxides of up to ten carbon atoms, such as propylene oxide or butylene oxide. The residue of the alkoxy poly(oxyalkylene) alcohol or amine contained in the acrylic polymer can be represented by D(CH(R$_1$)CH$_2$O—)$_n$R$_2$, and is either alkoxy polyoxyethylene or an alkoxy polyoxyethylene/polyoxyalkylene copolymer, having a degree of polymerization of n, n being an integer from one to one thousand. D is O in the case of the alkoxy poly(oxyalkylene) alcohol and NH in the case of the amine. Preferably, n is an integer from 20 to 200; more preferably, from 40 to 70. R$_1$ is thus either hydrogen or a mixture of hydrogen and alkyls of one to eight carbon atoms. It is particularly advantageous for $R_1$ to be either hydrogen or a mixture of hydrogen and alkyls of one to three carbon atoms. $R_2$ is an alkyl of one to thirty carbon atoms. $R_2$ is preferably an alkyl of one to ten carbon atoms. In one embodiment, $R_1$ can be hydrogen and $R_2$ can be methyl.

In addition to ethylenically unsaturated monomers having the carbamate functionality or the groups used to impart water dispersibility to the grafted acrylic polymer, or those bearing reactive groups that will be sites for the introduction of these groups onto the acrylic polymer as described above, one or more other ethylenically unsaturated monomers are employed in forming the first and second acrylics of the invention. Such monomers for copolymerization with acrylic monomers are known in the art. They include esters, nitriles, or amides of $\alpha,\beta$-olefinically unsaturated monocarboxylic acids containing 3 to 5 carbon atoms; diesters of $\alpha,\beta$-olefinically unsaturated dicarboxylic acids containing 4 to 6 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; acrylates or methacrylates having hydroxy, isocyanato, or other functional groups, such as hydroxyalkyl acrylates and methacrylates, glycidyl esters of methacrylic or acrylic acid such as glycidyl methacrylate, and aminoalkyl esters of methacrylic or acrylic acid like N,N-dimethylaminoethyl (meth)acrylate; fumaric, maleic, and itacontc diesters, like maleic acid dimethyl ester and maleic acid dihexyl ester; vinyl acetate, vinyl propionate, vinyl ethyl ether, and vinyl ethyl ketone; styrene, a-methyl styrene, vinyl toluene, and 2-vinyl pyrrolidone.

The copolymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution or aqueous dispersion in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization is usually carried out at temperatures from about 20° C. to about 200° C., preferably from 90° C. to 170° C. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

If solvents are used in the polymerization reaction, the solvents used are preferably water or water-soluble or -miscible organic solvents that can function as cosolvents. A cosolvent is useful to aid in dispersion of the components and in flow during cure of the composition. Examples of useful solvents include methyl ethyl ketone, methyl isobutyl ketone, xylene, n-amyl acetate; and cosolvents such as N-methylpyrrolidone and glycol ethers like ethylene glycol butyl ether, ethylene glycol butyl ether acetate, diethylene glycol butyl ether, ethylene glycol 2-ethylhexyl ether, propylene glycol methyl ether, propylene glycol methyl ether acetate, propylene glycol butyl ether, and dipropylene glycol butyl ether.

The solvent or solvent mixture is generally heated to the reaction temperature and the monomers and initiator(s) used to make the first acrylic polymer or the second acrylic polymer are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed, usually over a period of one to sixty minutes, to ensure complete conversion.

The first and second acrylic polymers will generally have a molecular weight of 2000–20,000, and preferably from 4000–6000. Molecular weight as used herein means number average molecular weight, and can be determined by gel permeation chromatography (GPC) using a polystyrene standard. The weight per equivalent of carbamate functionality, will generally be between 200 and 1500, and preferably between 300 and 700.

The grafted acrylic polymer of the invention is made by reacting together the first acrylic polymer having the functionality (I) and the second acrylic polymer having the functionality (II) that is reactive toward the functionality (I) of the first acrylic polymer. There are many pairs of functional groups that could be employed for this purpose. For example, if functionality (I) is an isocyanate group, then functionality (II) can be a group with an active hydrogen such as an hydroxyl or primary or secondary amino group. Alternatively, functionality (I) could be an acid or anhydride group while functionality (II) could be an epoxy or hydroxyl group. In another method of reacting the first and second acrylic polymers together, functionality (I) could be epoxy while functionality (II) could be a carboxyl group, a primary or secondary amino group, or phenolic group. It is also possible for functionality (I) to be carbamate functionality and functionality (II) to be, for example, methylol, methoxy, isobutyoxy, or siloxane groups. In one preferred embodiment, functionality (I) is an epoxy group and functionality (II) is a carboxylic acid group, and it is particularly preferred in such a case that the groups that impart water dispersibility to the grafted acrylic polymer are carboxylic acid groups on the second acrylic polymer.

The invention contemplates various methods of reacting together the first and second acrylic polymers. In one scheme, the first and second acrylic polymers are formed in separate reaction vessels, then mixed together and reacted under appropriate conditions. In a second and preferred method, the first acrylic polymer is formed and then the second acrylic polymer is polymerized in the presence of the first acrylic polymer. After polymerization is completed, the polymer mixture is subjected to conditions conducive to the reaction between the functionalities (I) and (II) in order to form the grafted acrylic polymer. In another contemplated method, the second acrylic polymer is again polymerized in the presence of the previously formed first acrylic polymer, but in this case the reaction between functionalities (I) and (II) take place during the formation of the second acrylic polymer. The result of this reaction scheme is the formation of the second acrylic polymer and the grafted acrylic polymer in the same step. In each case, the amount of functionality (I) and functionality (II) on their respective polymers are chosen to avoid gelation of the reaction product. Gelation can be avoided by limiting the extent of reaction between functionalities (I) and (II), but it is usually preferred to limit the amount of one or the other of functionalities (I) and (II) on their respective polymers.

The practitioner will readily recognize that many combinations of groups for functionalities (I) and (II) will serve the purpose of reacting together the first and second acrylics to form the grafted acrylic polymer. While reaction conditions might vary, such conditions would be readily apparent to the skilled artisan from experience or straightforward testing. It may be useful to employ catalysts such as are known in the art, as for example to use tin catalyst in reacting isocyanate groups with alcohol groups or to use triphenyl phosphine or amines to catalyze reaction of epoxy groups with carboxylic acid groups.

The coating compositions of the invention contain aqueous dispersions of the grafted acrylic polymer. In one method of practicing the invention, the first and second acrylic polymers are prepared by emulsion polymerization and the reaction forming the grafted acrylic polymer is carried out in the aqueous medium. Alternatively, the first and second acrylic polymers may be formed in organic medium and then reacted together to form the grafted acrylic polymer. A sufficient amount of deionized water is then added to the grafted acrylic polymer to form an aqueous dispersion. In another method, the first and second acrylic polymers are polymerized in organic medium. The formed acrylic polymers may then be emulsified by addition of a sufficient quantity of deionized water to form a dispersion. The reaction forming the grafted acrylic polymer may then be carried out in the aqueous dispersion. In forming the aqueous dispersions of the acrylic polymers, anionic or cationic groups can be formed by salting with the appropriate counter ion. Anionic groups on the acrylic can be salted with ammonia or amines such as dibutylamine, dimethylethanolamine, or N-ethyl morpholine. Cationic groups on the acrylic can be salted with carboxylic acids such as formic acid, acetic acid, or lactic acid.

The composition of the invention is cured by a reaction of the carbamate-functional grafted acrylic polymer component (a) with a component (b) having a plurality of functional groups that are reactive with the carbamate groups on component (a). Such functional groups include active methylol or alkoxy groups on aminoplast resins or on other compounds, such as phenol/formaldehyde adducts; blocked isocyanate groups; or siloxane groups. Examples of (b) compounds include curing agents or crosslinking agents such as melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), N-methylol acrylamide emulsions, isobutoxy methyl acrylamide emulsions, and polysiloxanes (e.g., trimethoxy siloxane). Aminoplast resins such as melamine formaldehyde resins or urea formaldehyde resins are especially preferred.

The curing agent or crosslinking agent (b) is used in an amount sufficient to produce well-cured, solvent-resistant films. For example, when the preferred melamine curing agents are used, they are used at a total of 3 to 30 weight percent, based upon the total weight of the (a) and (b) components.

The coating composition used in the practice of the invention may also include a catalyst to enhance the cure reaction. For example, when aminoplast compounds, especially monomeric melamines, are used as component (b), a strong acid catalyst may be utilized to reduce the temperature or time needed for full cure. Such catalysts are well-known in the art and include, for example, p-toluenesulfonic acid, dinonylnaphthalene disulfonicacid, dodecylbenzenesulfonic acid, phenyl acid phosphate, monobutyl maleate, butyl phosphate, and hydroxy phosphate ester. These catalysts may be blocked, for example, with an amine, or they may be unblocked. Other catalysts that may be useful in the composition of the invention include Lewis acids, zinc salts, and tin salts such as dibutyl tin dilaurate or dibutyl tin oxide.

Additional water and or cosolvent may be added during preparation of the coating compositions. In a preferred embodiment of the invention, the water and organic solvent, including any cosolvent, is present in the coating composition in an amount of from about 0.01 weight percent to about 99 weight percent, preferably from about 40 weight percent to about 90 weight percent, and more preferably from about 50 weight percent to about 70 weight percent.

Other materials well-known to the coatings artisan, for example, surfactants, fillers, stabilizers, wetting agents, dispersing agents, adhesion promoters, UV absorbers, light stabilizers such as HALS, antioxidants, and rheology control agents, may be incorporated into the coating composition. The amount of these materials used must be controlled to avoid adversely affecting the coating characteristics.

The coating compositions according to the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When the present coating compositions are used as topcoat coatings, they preferably have a 20° gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating. The coating composition of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like. In a preferred embodiment, the coating composition of the present invention is the clearcoat of a color-plus-clear composite coating. The clearcoat may be applied over a color coat according to the invention or may, alternatively, be applied over a color coat of a formulation already known in the art.

Pigmented color coat or basecoat compositions for such composite coatings are well-known in the art and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinking or may require a separate crosslinking agent that is reactive with the functional groups of the polymer. When the polymer comprises hydroxy functional groups, for example, the crosslinking agent may be an aminoplast resin, a polyisocyanate and blocked polyisocyanate resin (including an isocyanurate, biuret, or the reaction product of a diisocyanate and a polyol having less than twenty carbon atoms), and an acid or anhydride functional crosslinking agent.

Coating compositions can be coated on the article by any of a number of techniques well-known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

The coating compositions described herein are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93° C. and 177° C. In a preferred embodiment, the cure temperature is between 135° C. and 165° C. In another preferred embodiment, a blocked acid catalyst is included in the composition and the cure temperature is between 115° C. and 140° C. In a different preferred embodiment, an unblocked acid catalyst is included in the composition and the cure temperature is between 80° C. and 100° C. The curing time will vary depending on the particular components used and physical parameters, such as the thickness of the layers. Typical curing times range from 15 to 60 minutes, and preferably 15–25 minutes at the target temperature.

The invention is further described in the following examples.

Preparation I. Carbamate-functional Grafted Acrylic

A three-necked 5-1 round bottom flask was fitted with an agitator at the center neck and a thermal couple at one of the side necks to monitor the reaction temperature. A nitrogen purge line was also fed through this neck. The second side neck was fitted with a Claissen adapter and water cooled condenser.

A mixture of 213.3 g propylene glycol methyl ether and 240.0 g diethylene glycol butyl ether were charged to the flask and heated to 110° C. A monomer mixture I of 25.9 g glycidyl methacrylate, 177.6 g n-butyl acrylate, 413.4 g n-butyl methacrylate, 413.4 g cyclohexyl methacrylate, 122.6 g styrene, and 188.5 g t-butyl peroxy 2-ethylhexanoate was mixed in a separate addition pot and then added to the flask over a three-hour period at constant temperature. A separate monomer mixture II of 738.2 g carbamate propyl methacrylate (96%), 738.2 g propylene glycol methyl ether, and 0.19 g 4-methoxy phenol was added simultaneously over the three-hour period. After the additions were complete, the addition pots were rinsed with a total of 31.6 g propylene glycol methyl ether, which was then added to the flask. Following the rinse, a mixture of 18.6 g t-butyl peroxy 2-ethylhexanoate and 13.2 g propylene glycol methyl ether was added to the flask over a period of 30 minutes. The contents of the flask were then held at a constant temperature of 108° C. for 30 minutes.

A monomer mixture III of 9.9 g n-butyl acrylate, 22.4 g n-butyl methacrylate, 22.4 g cyclohexyl methacrylate, 6.7 g styrene, 47.7 g acrylic acid, and 5.1 g t-butyl peroxy 2-ethylhexanoate was mixed in the addition pot and then added to the flask over a one-hour period at constant temperature. A separate monomer mixture IV of 40.4 g carbamate propyl methacrylate (96%), 40.4 g propylene glycol methyl ether, and 0.01 g 4-methoxy phenol was added simultaneously over the one-hour period. After the additions were complete, the addition pots were rinsed with a total of 31.6 g propylene glycol methyl ether, which was then added to the flask. Next, 2.5 g t-butyl peroxy 2-ethylhexanoate and 30.6 g propylene glycol methyl ether were added to the flask over a period of 30 minutes. The content of the flask were maintained at constant temperature for an additional 30 minutes. Finally, 0.4 g triphenyl phosphine and 11.1 g propylene glycol methyl ether were added to flask and the temperature was maintained until acid number indicated that all of the epoxy functionality had theoretically been consumed.

The contents of the flask were cooled to 88° C. and 41.9 g dimethylethanolamine, 24.5 g Tinuvin® 123, and 43.2 g Tinuvin® 384B were stirred in. The resulting mixture was transferred to a plastic pail. Deionized water was added with stirring until a dispersion having a nonvolatile content of 43.3% was obtained.

Preparation II. Hydroxyl-Functional Grafted Acrylic

A three-necked 5-1 round bottom flask was fitted with an agitator at the center neck and a thermal couple at one of the side necks to monitor the reaction temperature. A nitrogen purge line was also fed through this neck. The second side neck was fitted with a Claissen adapter and water cooled condenser.

A mixture of 213.3 g propylene glycol methyl ether and 240.0 g diethylene glycol butyl ether were charged to the flask and heated to 110° C. A monomer mixture I of 25.9 g glycidyl methacrylate, 177.6 g n-butyl acrylate, 413.4 g n-butyl methacrylate, 413.4 g cyclohexyl methacrylate, 122.6 g styrene, 439.2 g hydroxyethyl acrylate, 188.5 g t-butyl peroxy 2-ethylhexanoate, and 153.9 g propylene glycol methyl ether was mixed in a separate addition pot and then added to the flask over a three-hour period at constant temperature. After the addition was complete, the addition pot was rinsed with 20.1 g propylene glycol methyl ether, which was then added to the flask. Following the rinse, a mixture of 18.6 g t-butyl peroxy 2-ethylhexanoate and 13.2 g propylene glycol methyl ether was added to the flask over a period of 30 minutes. The contents of the flask were then held at a constant temperature of 108° C. for 30 minutes.

A monomer mixture II of 9.9 g n-butyl acrylate, 22.4 g n-butyl methacrylate, 22.4 g cyclohexyl methacrylate, 6.7 g styrene, 47.7 g acrylic acid, 24.2 g hydroxyethyl acrylate, 5.1 g t-butyl peroxy 2-ethylhexanoate, and 96.5 g propylene glycol methyl ether was mixed in the addition pot and then added to the flask over a one-hour period at constant temperature. The addition pot was rinsed with 51.1 g propylene glycol methyl ether, which was then added to the flask. Next, 2.5 g t-butyl peroxy 2-ethylhexanoate and 30.6 g propylene glycol methyl ether were added to the flask over a period of 30 minutes. The content of the flask were maintained at constant temperature for an additional 30 minutes. Finally, 0.4 g triphenyl phosphine and 11.1 g propylene glycol methyl ether were added to flask and the temperature was maintained until the acid number indicated that all of the epoxy functionality had theoretically been consumed.

The contents of the flask were cooled to 88° C. and 41.9 g dimethylethanolamine, 24.5 g Tinuvin® 123, and 43.2 g Tinuvin® 384B were stirred in. The resulting mixture was transferred to a plastic pail. Deionized water was added with stirring until a dispersion having a nonvolatile content of 39.4% was obtained.

EXAMPLE 1

Aqueous Clear Coating Composition

A clear coating composition was prepared by combining the following materials in order:

355.4 g carbamate functional grafted acrylic (Preparation I)

21.4 g Cymel® 327 (high imino methylated melamine from American Cyanamid)

14.4 g Silwet® 7602 (silicone leveling agent, 10% in ethylene glycol butyl ether from Union Carbide, Danbury, Conn.)

9.0 g Tegoflow® 425 (flow and leveling agent, 25% in ethylene glycol butyl ether from Tego Chemie Service USA, Hopewell, Va.)

EXAMPLE 2

Aqueous Clear Coating Composition

A clear coating composition was prepared by combining the following materials in order:

375 g carbamate functional grafted acrylic (Preparation I)

18.2 g hexamethoxymethylated melamine 4.0 g Silwet® 7602 (silicone leveling agent, 10% in ethylene glycol butyl ether from Union Carbide, Danbury, Conn.)

3.0 g Tegoflow® 425 (flow and leveling agent, 25% in ethylene glycol butyl ether from Tego Chemie Service USA, Hopewell, Va.)

5.4 g Nacure® XP267 (blocked acid catalyst solution from King Industries)

72.5 g deionized water

COMPARATIVE EXAMPLE A

Aqueous, Clear Coating Composition

A clear coating composition was prepared by combining the following materials in order:

282.9 g hydroxy functional grafted acrylic (Preparation II)

24.4 g Cymel® 327 (high imino methylated melamine from American Cyanamid)

21.4 g Silwet® 7602 (silicone leveling agent, 10% in ethylene glycol butyl ether from Union Carbide, Danbury, Conn.)

14.4 g Tegoflow® 425 (flow and leveling agent, 25% in ethylene glycol butyl ether from Tego Chemie Service USA, Hopewell, Va.)

40.0 g butyl Carbitol®

COMPARATIVE EXAMPLE B

Aqueous, Clear Coating Composition

A clear coating composition was prepared by combining the following materials in order:

1555.4 g carbamate functional grafted acrylic (Preparation 1)

83.2 g hexamethoxy methylated melamine 16.0 g Silwet® 7602 (silicone leveling agent, 10% in ethylene glycol butyl ether from Union Carbide, Danbury, Conn.)

12.0 g Tegoflow® 425 (flow and leveling agent, 25% in ethylene glycol butyl ether from Tego Chemie Service USA, Hopewell, Va.)

20.6 g Nacure® XP267 (blocked acid catalyst solution from King Industries)

45.0 g butyl Carbitol®

276 g deionized water

The coating compositions of Examples 1 and 2 and Comparative Examples A and B were sprayed in two coats (one minute flash between coats) over steel panels that had been previously sprayed with a high solids black acrylic pigmented basecoat and flashed for ten minutes. The clear coated panel was flashed for ten minutes in a 120° F. oven. The oven temperature was increased over 45 minutes to the bake temperature indicated in the table below and the panels were cured at that temperature for 20 minutes.

Film builds:

basecoat 0.8 to 1.0 mil (20.3 to 25.4 microns)

clearcoat 1.4 to 1.8 mil (35.6 to 45.7 microns)

The coated panels were subjected to 16 weeks of severe weathering conditions in Jacksonville, Fla., with the results indicated in the table. The numbers indicate etch ratings on a scale where 1=no visible etch, 10=severe etch.

| Example | 138° C. Cure | 149° C. Cure |
| --- | --- | --- |
| Example 1 | 6 | 5 |
| Example 2 | 8 | 5 |
| Comparative Example A | 10+ | 10+ |
| Comparative Example B | 10 | 10 |

The invention has been described in detail with reference to preferred embodiments thereof. It should be understood, however, that variations and modifications can be made within the spirit and scope of the invention.

We claim:

1. An aqueous, curable coating composition comprising:
   (a) a carbamate-functional grafted acrylic polymer that comprises the reaction product of:
      i) a first acrylic polymer having thereon a functionality (I);

(ii) a second acrylic polymer having thereon a functionality (II) that is reactive toward the functionality (I) of the first acrylic polymer, wherein:
at least one of the first and second acrylic polymers has thereon groups that impart water dispersibility to the grafted acrylic polymer, and
at least one of the first and second acrylic polymers has thereon carbamate functionality; and (b) a compound having a plurality of functional groups that are reactive with the carbamate functionality.

2. A coating composition according to claim 1 wherein the groups that impart water dispersibility to the grafted acrylic polymer are artionic groups.

3. A coating composition according to claim 2 wherein the groups that impart water dispersibility to the grafted acrylic polymer are carboxylic acid groups.

4. A coating composition according to claim 1 wherein the groups that impart water dispersibility to the grafted acrylic polymer are nonionic groups.

5. A coating composition according to claim 1 wherein the groups that impart water dispersibility to the grafted acrylic polymer are on the second acrylic polymer.

6. A coating composition according to claim 5 wherein the functionality (I) is epoxy functionality and both the functionality (II) and the groups that impart water dispersibility are carboxylic acid groups.

7. A coating composition according to claim 5 wherein the carbamate functionality is on both the first and the second acrylic polymers.

8. A coating composition according to claim 1 wherein the groups that impart water dispersibility to the grafted acrylic polymer are on both the first and the second acrylic polymers.

9. A coating composition according to claim 1 wherein the carbamate functionality is on only one of the first and second acrylic polymers.

10. A coating composition according to claim 1 wherein the carbamate functionality is on both the first and the second acrylic polymers.

11. A coating composition according to claim 1 wherein the carbamate functionality comprises the structure

—L—O—C(=O)—NHR, wherein

L represents a divalent linking group, and

R represents H, alkyl, or cycloalkyl.

12. A coating composition according to claim 11 wherein the R is hydrogen.

13. A coating composition according to claim 11 wherein the R is an alkyl of 1 to 6 carbon atoms.

14. A coating composition according to claim 11 wherein the R is cycloalkyl with 6 ring carbon atoms.

15. A coating composition according to claim 11 wherein L has the formula

—COO—L'—, wherein L' is a divalent linking group.

16. A coating composition according to claim 1 wherein component (b) has functional groups selected from the group consisting of siloxane, blocked isooyanate, alkoxy, and methylol functional groups.

17. A coating composition according to claim 16 wherein component (b) has functional groups selected from the group consisting of alkoxy and methylol functional groups.

18. A coating composition according to claim 1 wherein component (b) is an aminoplast resin.

19. A coating composition according to claim 18 wherein the aminoplast resin is a melamine formaldehyde resin.

20. A coating composition according to claim 19 wherein the melamine formaldehyde resin is fully or partially alkylated.

21. A coating composition according to claim 1 wherein the carbamate-functional grafted acrylic polymer is produced according to a method comprising polymerizing the second acrylic polymer in the presence of the first acrylic polymer.

* * * * *